(12) United States Patent
Phillips

(10) Patent No.: US 10,106,100 B1
(45) Date of Patent: Oct. 23, 2018

(54) SECURE LATCH FOR COUPLED ASSEMBLIES

(71) Applicant: Cal M. Phillips, Platteville, WI (US)

(72) Inventor: Cal M. Phillips, Platteville, WI (US)

( * ) Notice: Subject to any disclaimer, the term of this patent is extended or adjusted under 35 U.S.C. 154(b) by 0 days.

(21) Appl. No.: 15/993,138

(22) Filed: May 30, 2018

(51) Int. Cl.
  *B60R 9/10* (2006.01)
  *E05B 57/00* (2006.01)
  *B60R 9/06* (2006.01)

(52) U.S. Cl.
  CPC ............. *B60R 9/10* (2013.01); *E05B 57/00* (2013.01); *B60R 9/06* (2013.01)

(58) Field of Classification Search
  CPC ... B60R 9/06; B60R 9/10; E05B 57/00; E05B 59/00; Y10T 403/32918; Y10T 403/32993; Y10T 403/587
  See application file for complete search history.

(56) References Cited

U.S. PATENT DOCUMENTS

| | | | | |
|---|---|---|---|---|
| 2,967,726 A | * | 1/1961 | Weston | E02F 9/006 403/157 |
| 3,904,299 A | * | 9/1975 | Loonis | F16C 11/045 403/157 |
| 4,133,121 A | * | 1/1979 | Hemphill | E02F 3/3604 37/444 |
| 4,252,504 A | * | 2/1981 | Covington | B64C 27/50 416/143 |
| 4,400,898 A | * | 8/1983 | Christensen | E02F 9/006 37/444 |
| 4,568,217 A | * | 2/1986 | Forsman | B66F 9/12 403/319 |
| 5,497,927 A | * | 3/1996 | Peterson | B60R 9/06 224/519 |
| 5,558,260 A | * | 9/1996 | Reichert | B62J 1/14 224/413 |
| 5,593,264 A | * | 1/1997 | Schlegel | A01B 59/002 411/344 |
| 5,647,521 A | * | 7/1997 | Burgess | B60R 9/10 224/505 |
| 5,658,035 A | * | 8/1997 | Armstrong | B62J 17/04 296/78.1 |
| 5,678,282 A | * | 10/1997 | Stewart | A44C 5/2066 24/574.1 |
| 5,732,965 A | * | 3/1998 | Willey | B62J 17/04 180/219 |
| 5,788,135 A | * | 8/1998 | Janek | B60R 9/065 224/282 |
| 5,833,074 A | * | 11/1998 | Phillips | B60R 9/10 211/21 |

(Continued)

*Primary Examiner* — Corey N Skurdal
(74) *Attorney, Agent, or Firm* — John V. Stewart

(57) ABSTRACT

A latch pivots about and slides axially on an axle on a second assembly. It is manually pulled axially outward against a spring to clear and pivot over a boss on a first assembly. It then slides over the boss via a boss receiving hole in the latch, interconnecting the two assemblies. A spring urges the latch inward, retaining it on the boss. A hole for a shackle may be provided in the first assembly and in the latch to lock the latch in the connected position. The latch may pivot to a retracted position over a shackle hole in the second assembly to store a lock on the second assembly. It prevents separation of two assemblies that are coupled by a pivoting engagement of one assembly relative to the other.

20 Claims, 5 Drawing Sheets

(56) References Cited

U.S. PATENT DOCUMENTS

| | | | | |
|---|---|---|---|---|
| 6,155,524 A | * | 12/2000 | Legler | B25H 3/006 |
| | | | | 248/221.11 |
| 6,244,483 B1 | * | 6/2001 | McLemore | B60R 9/06 |
| | | | | 224/521 |
| 6,273,632 B1 | * | 8/2001 | Takahashi | F16C 11/02 |
| | | | | 403/14 |
| 6,484,914 B1 | * | 11/2002 | Willey | B62J 1/28 |
| | | | | 224/413 |
| 6,491,195 B1 | * | 12/2002 | McLemore | B60R 9/06 |
| | | | | 224/521 |
| 7,090,280 B2 | * | 8/2006 | Willey | B62J 11/00 |
| | | | | 224/413 |
| 7,946,632 B1 | * | 5/2011 | Mueller | B62J 1/28 |
| | | | | 280/288.4 |
| 8,480,328 B2 | * | 7/2013 | Lin | G06F 1/186 |
| | | | | 220/4.02 |
| 9,956,922 B2 | | 5/2018 | Phillips | |
| 10,065,698 | * | 9/2018 | Sliwa | B62J 9/001 |
| 2008/0099522 A1 | * | 5/2008 | Clausen | B60R 9/06 |
| | | | | 224/519 |

* cited by examiner

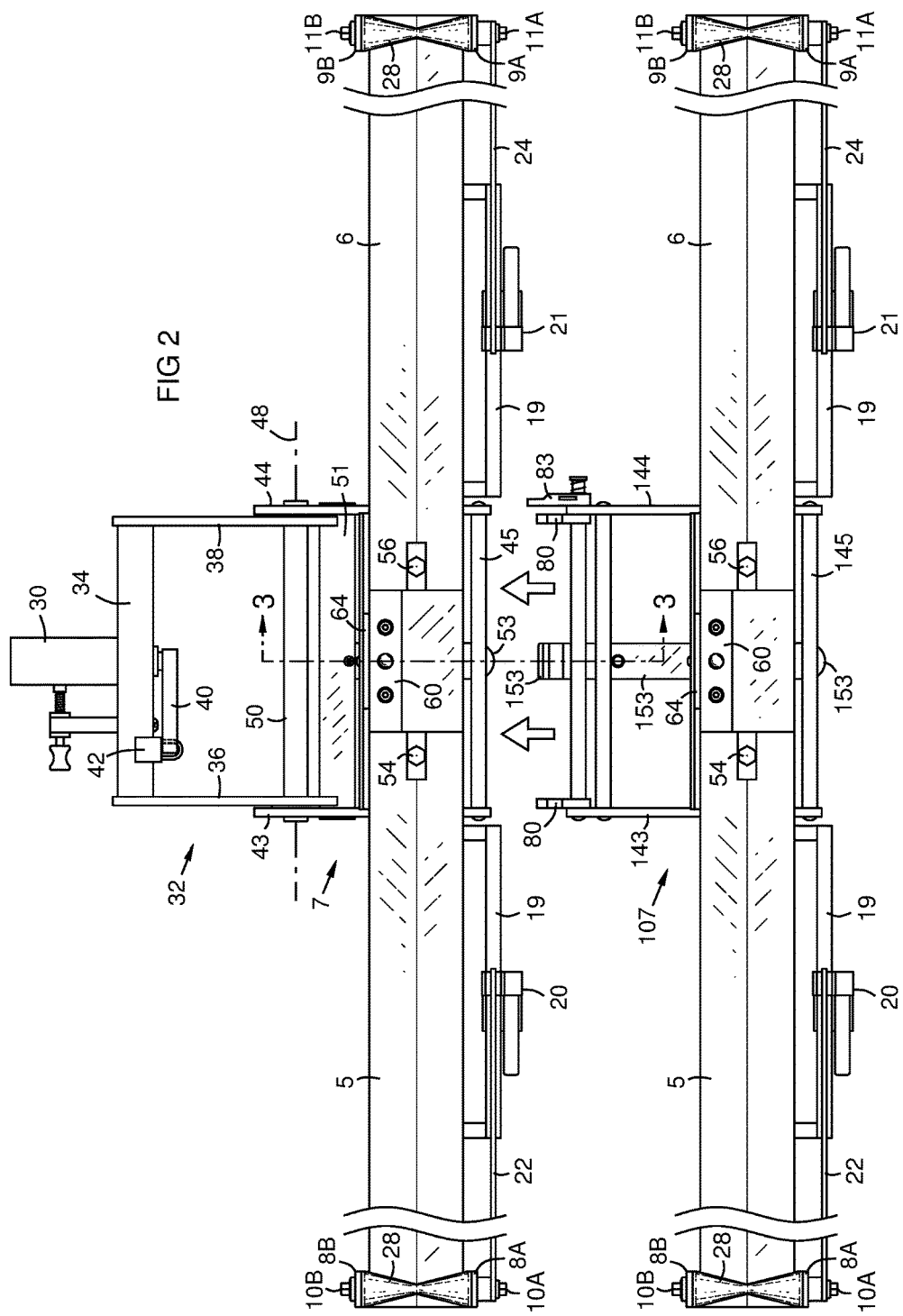

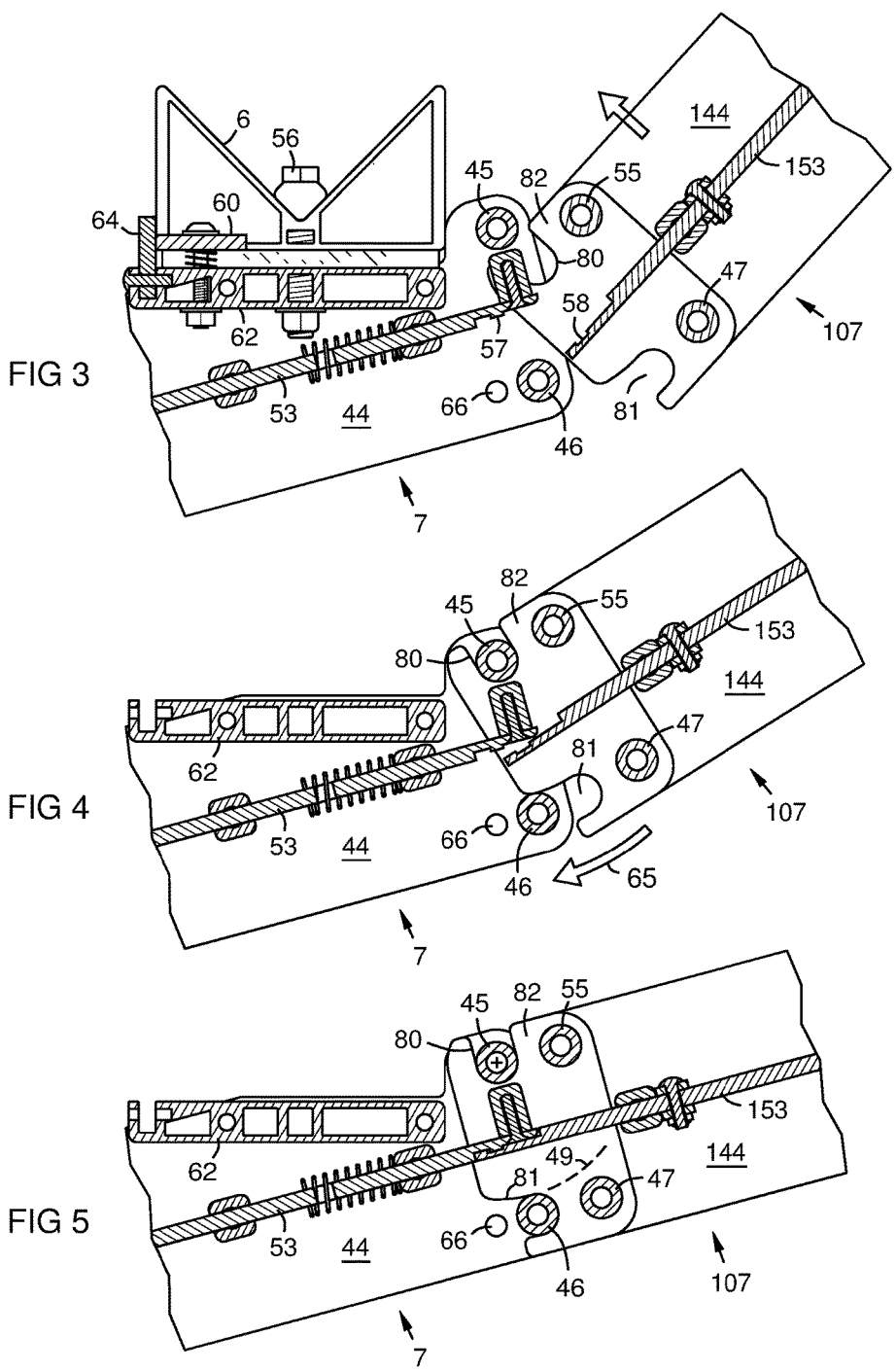

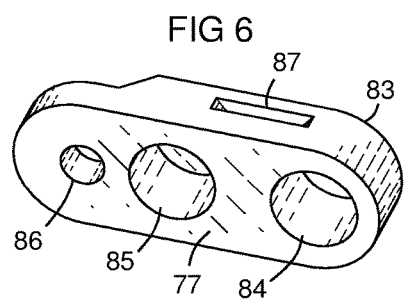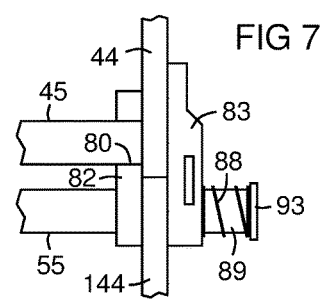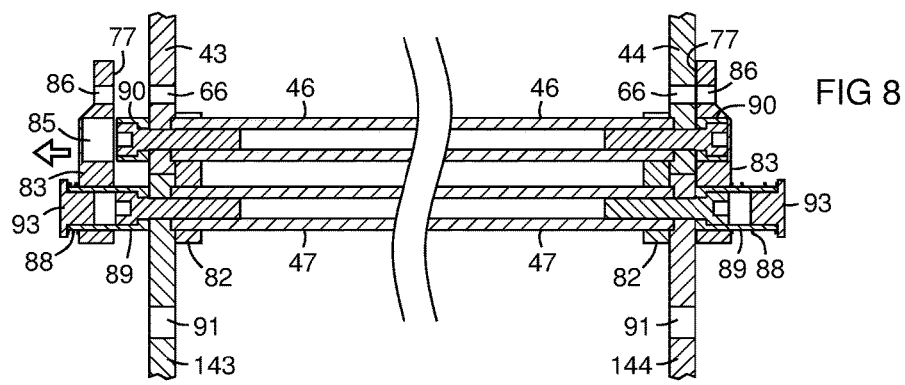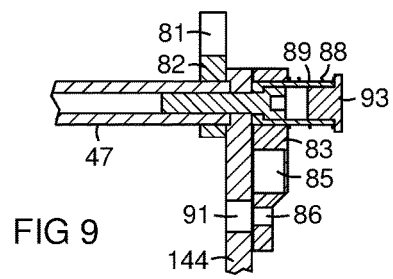

US 10,106,100 B1

SECURE LATCH FOR COUPLED ASSEMBLIES

FIELD OF THE INVENTION

This invention relates to releasable couplings, and particularly to coupling an add-on bike carrying assembly to a main assembly of a bike carrier for a trailer hitch receiver.

BACKGROUND OF THE INVENTION

Racks for carrying bikes by the trailer hitch receiver of motor vehicles may offer a wheel tray assembly for each bike to be carried. Multiple wheel tray assemblies may be coupled to carry multiple bikes. The bike carrier described herein incorporates assembly coupling aspects from U.S. Pat. No. 9,956,922 of the present inventor that issued May 1, 2018.

SUMMARY OF THE INVENTION

A latch mechanism is described that quickly secures one assembly to another when the assemblies are coupled in abutment. It is designed to prevent separation of the two assemblies at the location of the latch and to secure the coupling with a lock.

BRIEF DESCRIPTION OF THE DRAWINGS

The invention is explained in the following description in view of the drawings that show:

FIG. 2 is a top view of the bike carrier of FIG. 1 with an add-on tray assembly in position for coupling to a main tray assembly.

FIG. 3 is a sectional view taken on line 3-3 of FIG. 2 showing a step of coupling the add-on tray assembly to the main tray assembly.

FIG. 4 is a view as in FIG. 3 showing another step in the coupling.

FIG. 5 is a view as in FIG. 3 showing another step in the coupling.

FIG. 6 is a perspective view of a security latch in accordance with the invention.

FIG. 7 is a partial top view of the right side plates of the main and add-on tray assemblies in edge-to-edge abutment.

FIG. 8 is a top sectional view taken on a horizontal plane through the latch axle and the back lower coupling bar of the main tray assembly.

FIG. 9 is a partial top sectional view of the right side plate of the add-on tray assembly.

GLOSSARY

"Bike" herein means a two-wheeled vehicle, including velocipede bicycles and motorcycles.

"Front" and "back" of the bike carrier described herein is oriented with a motor vehicle to which the bike carrier is attached by a trailer hitch receiver. Thus, a "back view" of the bike carrier shows a side of the bike.

DETAILED DESCRIPTION OF THE INVENTION

Figure 1:
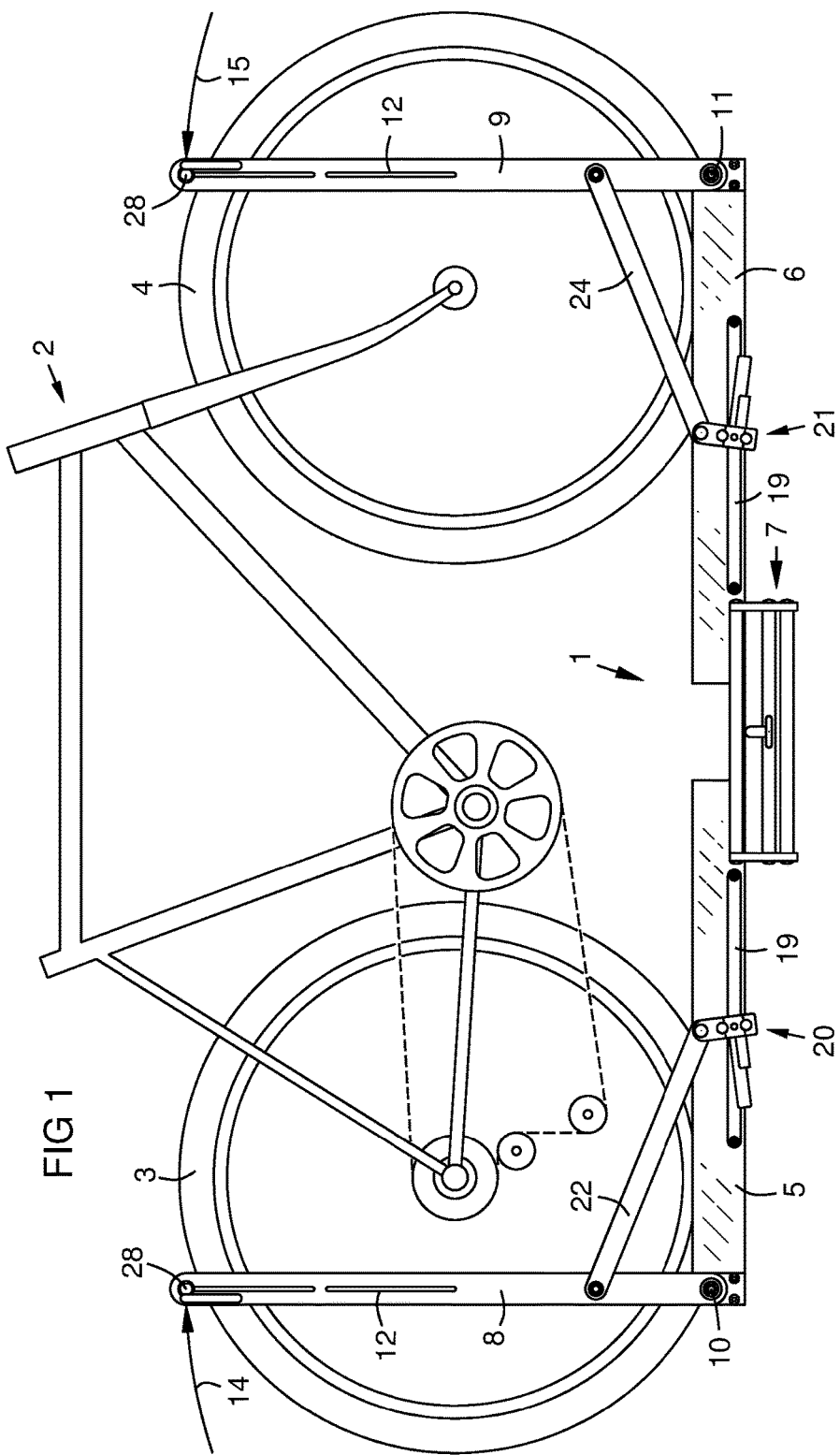
FIG. 1 is a back view of a bike carrier for a trailer hitch receiver according to aspects of the invention.

FIG. 1 is a back view of a bike carrier 1 for a trailer hitch receiver according to aspects of the invention. A bike 2 is mounted on the carrier by placing its wheels 3, 4 in respective wheel trays 5, 6. These trays may be extrusions such as U-channel or V-channel that are convex upward to retain the wheels and lock the steering of the bike. The trays are mounted to a main wheel tray assembly 7 that is attached to a drawbar as later shown.

A wheel retention arm 8, 9 is attached pivotally 10, 11 near the distal end of each tray 5, 6. Each wheel retention arm comprises a side arm on each side of each tray 5, 6. Only the back side arm of each wheel retention arm is visible here. A cross member 28 between the front and back side arms of each retention arm 8, 9 contacts the tire. The side arms may have slots 12 to adjust the position of the cross member for different wheel diameters. Each retention arm 8, 9 pivots inward 14, 15 until the cross member contacts the tire of the nearest wheel 3, 4 at a point above and outward from the wheel axle This brackets the bike and blocks it from moving in any direction. The bike is held firmly in place and cannot bounce upward or roll off the tray. The arms contact only the tires via the cross members. Each cross member is locked against a tire by a linear ratchet mechanism 20, 21 that moves along a ratchet bar 19 to retain a stay 22, 24 between the ratchet bar and the retention arm 8, 9.

FIG. 2 is a top view of the bike carrier of FIG. 1 plus an add-on wheel tray assembly 107 positioned for coupling to the main wheel tray assembly 7. A trailer hitch drawbar 30 may be attached to the main tray assembly 7 via a drawbar assembly 32 comprising a horizontal crossbar 34 attached to the drawbar, and left and right vertically oriented pivot plates 36, 38 attached to the crossbar. The drawbar may have an internal mechanism (not shown) operated by a lever 40 that tightens the drawbar in the receiver tube of the vehicle. A padlock 42 may secure the lever when the drawbar is tightened in the receiver.

The wheel tray assembly 7 comprises left and right side plates 43, 44 attached to the drawbar assembly on a horizontal pivot axis 48 that allows the wheel tray assembly 7 to pivot upward close behind the motor vehicle when no bike is being carried, and to pivot downward for opening a tailgate. The pivot axis may be implemented by a pivot axle journaled in a pivot cross member 50 between the pivot plates 36, 38 that serves as a structural member of the drawbar assembly 32. The vertical pivot position of the bike tray assembly 7 is locked with a pivot lock bar 51 operated via a trigger bar 53 from the back of the tray assembly 7.

The bike wheel trays 5, 6 are mounted to the main tray assembly 7 by respective pivot attachments 54, 56 to pivot between the shown operational co-aligned laterally extending position and a forward side-by-side folded position over the drawbar assembly 32 for shipping and storage. A tray open lock plate 60 may be disposed between the inner ends of the trays to prevent the trays from pivoting forward until they are released by depressing the tray open lock plate. A tray folding stop plate 64 stops the trays from pivoting forward past a desired compact folded position, such as parallel.

Wheel retention arm 8 (FIG. 1) comprises back and front side arms 8A, 8B attached to respective sides of the wheel tray 5 by coaxial pivot points 10A, 10B. A cross member 28 is attached between the two side arms through the slots 12 (FIG. 1). Wheel retention arm 9 comprises back and front side arms 9A, 9B attached to respective sides of the wheel tray 6 by coaxial pivot points 11A, 11B. A cross member 28 is attached between the two side arms through the slots 12 (FIG. 1). Each cross member 28 has a waist as shown to receive a bike tire.

The add-on tray assembly 107 has side plates 143, 144, and is similar to the main tray assembly, except it is not attached to a drawbar assembly, but instead has front coupling slots 80 that couple it to coupling bars 45 on the back of the main tray assembly as later shown to carry a second bike. A security latch 83 secures the add-on tray assembly 107 to the main tray assembly 7 in combination with the coupling mechanism 45, 80. An add-on trigger bar 153 in the add-on assembly may automatically couple to the trigger bar 53 of the main tray assembly to operate the pivot lock bar 51 from the back of the add-on tray assembly. The add-on tray assembly 107 has coupling bars 145 at the back to add a further add-on tray assembly.

FIGS. 3-5 are side sectional views taken on line 3-3 of FIG. 2 showing relative positions of the right side plate 44 of the main tray assembly 7 and right side plate 144 of the add-on tray assembly 107 during steps of coupling the add-on tray assembly to the main tray assembly. The right tray 6 may be mounted by a pivot bolt 56 to a tray crossbar 62 that spans between the left and right side plates 43, 44 of the main tray assembly. An upward facing slot 80 is provided in a coupling plate 82 attached to the front inner surface of each side plate 143, 144 of the add-on tray assembly as seen in FIG. 2. In FIG. 3, the slot 80 is aligned to slip over the back upper coupling bar 45 of the main tray assembly from behind. The lower back end 57 of the main trigger bar 53 may automatically couple with the upper front end 58 of the add-on trigger bar 153 during the add-on tray coupling process. FIG. 4 shows the coupling plate 82 has a lower coupling slot 81 that slips over a back lower coupling bar 46 on the main tray assembly when the add-on tray assembly is pivoted 65 about the back upper coupling bar 45. Front upper and lower structural crossbars 55, 47 may be provided on the add-on tray assembly. FIG. 5 shows the coupling bars 45, 46 fully inserted into the respective coupling slots 80, 81. A hole 66 may be provided for a shackle to lock the security latch 83 (FIG. 1) as later shown.

The coupling slots 80, 81 face in different directions such that when the coupling bars 45, 46 are fully inserted in the coupling slots 80, 81 they cannot escape by a simple linear translation of the add-on tray assembly relative to the main tray assembly. The upper coupling bar 45 cannot escape from the upper coupling slot 80 until the add-on tray assembly is rotated backward/upward about the upper coupling bar to move the lower coupling slot away from the lower coupling bar. After this is done the front of the add-on tray assembly can be moved downward away from the upper coupling bar. To achieve this limitation the coupling slots face 90 degrees apart or substantially 90 degrees apart in a plane normal to the coupling bars. For example, the upper coupling slot 80 faces upward, and the lower coupling slot faces forward. Preferably, the lower coupling slot 81 is oriented circumferentially with respect to the upper coupling bar when the upper coupling bar is fully inserted in the upper coupling slot. This circumferential orientation is illustrated by a dashed arc 49 that is centered "+" in the upper coupling bar. The latch prevents backward/upward pivoting of the add-on tray assembly about the upper coupling bar 80, which prevents the lower coupling bar 46 from escaping the lower coupling slot, which in turn prevents the upper coupling bar 45 from escaping the upper coupling slot 80.

The add-on tray assembly 107 may have the same back end configuration as the main tray assembly 7 to allow coupling of a further one or more add-on tray assemblies to carry a further bike or bikes up to a design stress limit of the drawbar assembly. Each add-on tray assembly may include an add-on trigger bar to operate the pivot lock plate at the front of the main tray assembly. Each add-on tray assembly may include one or two security latches as next described.

FIG. 6 is a perspective view of the security latch 83. It has a bearing hole 84 that is a through hole, a boss receiving hole 85 that may be a through hole or a blind hole, and a lock shackle hole 86 that is a through hole. If the boss receiving hole 85 is blind it blocks access to the boss, allowing the boss to be a machine screw with a socket head without loss of security. The latch may have a slot 87 on two sides for improved finger grip. It has an inner or proximal surface 77 relative to the side plate to which it is attached. This surface may contact and be coplanar with the outer surfaces of the coupled side plates.

FIG. 7 is a top partial view of the right side plates 44, 144 of the main and add-on tray assemblies in edge-to-edge abutment. The back upper coupling bar 45 of the main tray assembly is within the front upper coupling slot 80 of the coupling plate 82. The secure latch 83 is pushed against the outer surface of the right side plates 44, 144 by a compression spring 88 retained by a spring retainer 93 on an axle 89 on which the latch is mounted for both pivoting and for axial sliding. In the shown position, the latch secures the main tray assembly to the add-on tray assembly by capturing a boss on the main tray assembly as later shown.

FIG. 8 is a top sectional view taken on a horizontal plane through the latch axle 89 and the back lower coupling bar 46 of the main tray assembly. A boss 90 on the right side plate 44 is captured in the boss receiving hole 84 (FIG. 6), securing the side plates 44, 144 in abutment edge-to-edge, and preventing the back lower coupling bar 46 of the main tray assembly from escaping the front lower coupling slot 81 (FIG. 5) of the add-on tray assembly. The lock shackle hole 86 of the latch aligns with the lock shackle hole 66 of the side plate 44, allowing the latch to be locked to the side plate 44, preventing theft of the add-on tray assembly. The latch is in a proximal position relative to side plates 44, 144 in which the proximal surface 77 of the latch contacts the outer surfaces of the side plates 44 and 144. The axle 89 and the boss 90 may be formed as cylindrical tubes with one partly closed end to receive a machine screw as shown. The spring retainer 93 may be formed as a plug in the distal end of the axle 89.

A second latch 83 is shown on the left side plate 143 in a distal position relative to side plates 43, 143 in which the proximal surface 77 of the latch clears the boss 90. It is pulled laterally or distally away from the side plate against the force of the spring 88 enough to clear the boss 90. This allows the security latch to pivot about the axle 89 to position the boss retention hole 85 over the boss 90 for retention as shown on the right side of this figure or to pivot the latch backward for storage as shown in FIG. 9. Instead of two latches as shown, a single latch may be provided only on the left or the right side plate 143, 144.

FIG. 9 shows the add-on side plate 144 separate from the main tray side plate 44. The latch 83 can be rotated 180 degrees from the secured position of FIG. 7. A lock shackle hole 86 in the latch may be aligned with a lock shackle hole 91 in the add-on side plate 144 for storage of the lock when the add-on tray assembly is not in use.

Figure 10:
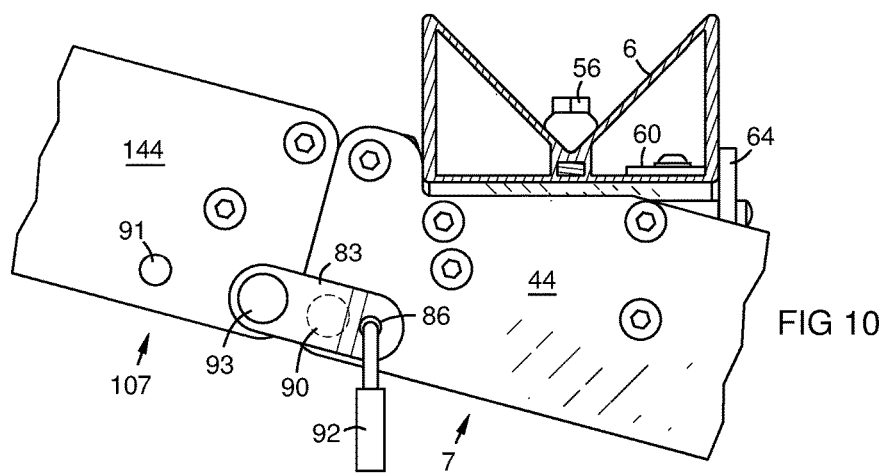
FIG. 10 is a partial right side view of the right side plates of the main tray assembly and the add-on tray assembly.

FIG. 10 is a partial right side view of right side plates 44 and 144 of the main tray assembly 7 and the add-on tray assembly 107 showing the security latch 83 secured on the boss 90 with a security lock 92, for example a padlock. The boss may be hidden in a boss receiving blind hole 85 (FIG. 6).

Figure 11:
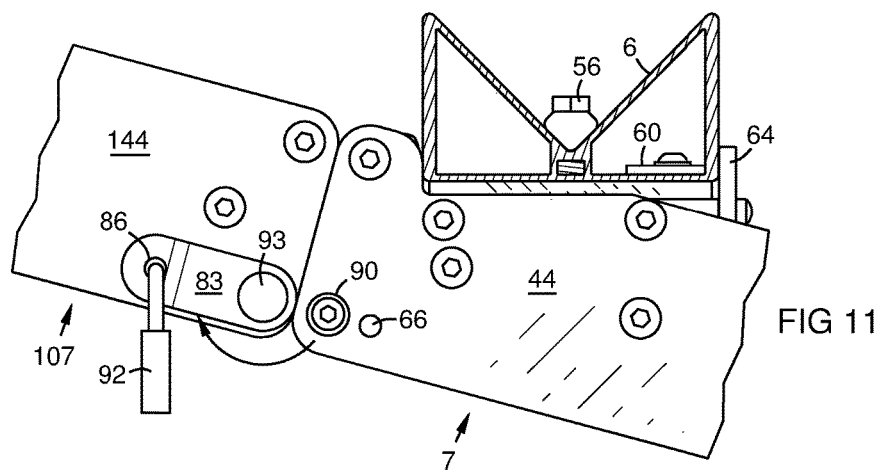
FIG. 11 is a view as in FIG. 10, showing the security latch pivoted backward to a retracted position.

FIG. 11 shows the security latch pivoted backward to a retracted position. A lock storage hole 91 (FIG. 10) may be provided in the add-on side plate 144 for storage of the security lock 92 or it may be stored in the lock hole 66 of the main tray assembly or it may be stored separately from the bike carrier.

Alternately to the examples shown herein, the coupling slots 80, 81 may be on the back of the main tray assembly 7 and the coupling bars 45, 46 on the front of the add-on tray assembly. The latch may be on the same tray assembly as the coupling slots or alternately on the same tray assembly as the coupling bars. All options are equivalent if the latch operates the same. For example, the latch mechanism may be mirrored left to right on the assembly or front to back about the abutting edges of the side plates.

Embodiments of the present invention shown and described herein are provided by way of example only. Changes and substitutions may be made without departing from the invention herein. Accordingly, the invention should be limited only by the intended meaning and scope of the claims.

The invention claimed is:

1. A secure latch mechanism for coupled assemblies comprising:
   a first assembly comprising a first part with a first surface with a boss extending therefrom;
   a second assembly comprising a second part with a second surface with an axle extending therefrom;
   a latch mounted on the axle for both pivoting about the axle and for sliding axially on the axle between a proximal position and a distal position relative to the second surface;
   wherein, when the first and second parts are in abutment and the first and second surfaces are aligned, the latch in the distal position clears the boss distally for pivoting over the boss then slides axially to capture the boss in a boss receiving hole of the latch; and
   a spring urging the latch to the proximal position.

2. The secure latch mechanism of claim 1, further comprising:
   a first shackle hole in the first part to receive a shackle of a lock; and
   a second shackle hole in the latch to receive the shackle;
   wherein, when the boss is in the boss receiving hole, the first and second shackle holes are aligned to receive the shackle.

3. The secure latch of claim 2 wherein the boss receiving hole is between the second shackle hole and an axle hole in the latch that receives the axle.

4. The secure latch of claim 2 further comprising a third shackle hole in the second part that aligns with the second shackle hole in the latch when the latch is pivoted over the third shackle hole, providing a retracted storage position for the latch and the lock.

5. The secure latch of claim 1 wherein the latch comprises a planar proximal surface that contacts both the first and second surfaces when the first and second parts are secured in abutment by the latch and the latch is in the proximal position.

6. The secure latch of claim 1 wherein the axle comprises a distal end with a retainer, and the spring is retained between the retainer and the latch.

7. The secure latch of claim 1 further comprising first and second grip slots in opposite sides of the latch to facilitate finger gripping of the latch to slide it on the axle against a force of the spring.

8. The secure latch of claim 1, wherein the first part comprises a side plate of a first bike wheel tray assembly in a bike carrier that holds a first bike by wheels thereof, and the second part comprises a side plate of a second bike wheel tray assembly attachable to the first bike wheel tray assembly to hold a second bike by wheels thereof in the carrier.

9. The secure latch of claim 8, further comprising:
   first and second coupling bars on the first or second tray assembly; and
   first and second coupling slots on the respective second or first tray assembly;
   wherein the first and second coupling slots face 90 degrees apart in a plane normal to the coupling bars;
   wherein the second coupling bar can only enter or exit the second coupling slot by the first coupling bar being within the first coupling slot, and by the tray assembly with the coupling slots pivoting about the first coupling bar to move the second coupling slot relative to the second coupling bar; and
   wherein the latch prevents said pivoting of the of the tray assembly with the coupling slots when the boss is captured in the boss receiving hole.

10. A secure latch mechanism for coupled assemblies comprising:
    a first bike wheel tray assembly comprising a first side plate with a first surface with a first edge, and a boss extending normally from the first surface;
    a second bike wheel tray assembly comprising a second side plate with a second surface with a second edge, and an axle extending normally from the second surface;
    a latch comprising a first end pivotally mounted on the axle, wherein the latch pivots about the axle and slides axially on the axle between a proximal position and a distal position relative to the second side plate;
    a spring that urges the latch to the proximal position;
    a first shackle hole in the first side plate to receive a shackle of a lock;
    a second shackle hole in the latch to receive the shackle; and
    a boss receiving hole in the latch that captures the boss in the proximal position of the latch and clears the boss in the distal position of the latch;
    wherein, when the boss is captured in the boss receiving hole, the first and second shackle holes are aligned to receive the lock shackle.

11. The secure latch of claim 10 further comprising:
    first and second coupling bars on the first tray assembly; and
    first and second coupling slots on the second tray assembly;
    wherein the second coupling slot is oriented circumferentially with respect to the first coupling bar when the first coupling bar is fully within the first coupling slot;
    wherein the second coupling bar can only enter or exit the second coupling slot by the first coupling bar being fully within the first coupling slot, and then the second tray assembly pivoting about the first coupling bar to move the second coupling slot relative to the second coupling bar; and
    wherein the latch prevents said pivoting of the second tray assembly when the boss is captured in the boss receiving hole.

12. The secure latch of claim 10 wherein the latch comprises a bar with a planar proximal surface that contacts and is coplanar with the first and second surfaces when the plates are secured edge-to-edge by the latch and the latch is in the proximal position.

13. The secure latch of claim 10 wherein the spring is a compression spring mounted around the axle between the latch and a retainer on a distal end of the axle.

14. The secure latch of claim 10 further comprising first and second grip slots in opposite sides of the latch to facilitate finger gripping of the latch to slide it on the axle.

15. The secure latch of claim 10 further comprising a third shackle hole in the second plate that aligns with the second shackle hole in the latch when the latch is pivoted over the third shackle hole.

16. A secure latch mechanism for coupled assemblies comprising:
- first and second coupling bars on a first or second assembly;
- first and second coupling slots on a respective second or first assembly;
- wherein the first and second coupling slots face substantially 90 degrees apart in a plane normal to the coupling bars;
- wherein the second coupling bar can only enter or exit the second coupling slot by the first coupling bar being within the first coupling slot, and then the assembly with the coupling slots pivoting about the first coupling bar to move the second coupling slot onto or away from the second coupling bar; and
- a latch that pivots about and slides axially on an axle on the first or second assembly, axially slides over and captures a boss on the respective second or first assembly, and prevents said pivoting of the assembly with the coupling slots.

17. The secure latch mechanism of claim 16 further comprising:
- the boss and the axle extend normally from respective first and second surfaces of the first and second assemblies;
- the latch comprises a bar mounted on the axle to pivot about the axle and to slide axially on the axle between a proximal position and a distal position;
- a boss receiving hole in the latch that captures the boss when the first and second assemblies are in abutment, the first and second surfaces are aligned, and the latch is in the proximal position;
- a spring urging the latch proximally; and
- the latch having a range of axial motion on the axle that allows the latch to clear the boss axially when the first and second parts are in abutment and the first and second surfaces are aligned.

18. The secure latch mechanism of claim 17, further comprising a first lock shackle hole in the assembly with the axle and a second shackle hole in the latch, wherein the first and second shackle holes are aligned when the boss is captured in the boss receiving hole.

19. The secure latch mechanism of claim 17, wherein the boss receiving hole is a blind hole.

20. The secure latch mechanism of claim 17, wherein the boss and the axle are each formed as a cylindrical tube with one partly closed end that receives a machine screw that holds the cylindrical tube against the respective surface, and the spring retainer is formed as a plug in a distal end of the axle.

* * * * *